A. B. JOHNSON.
Horse Hay-Rake.
No. 84,551.
Patented Dec. 1, 1868.
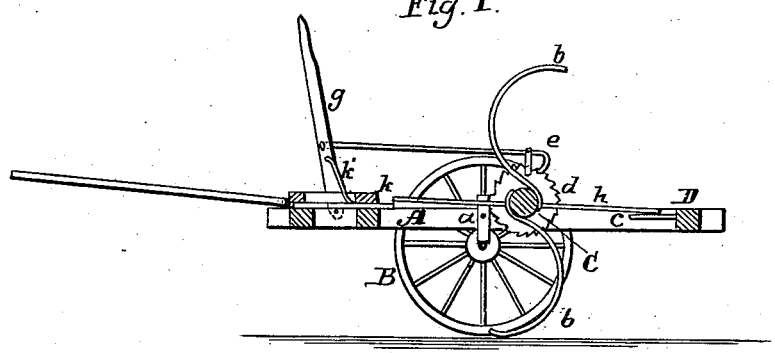
Fig. 1.
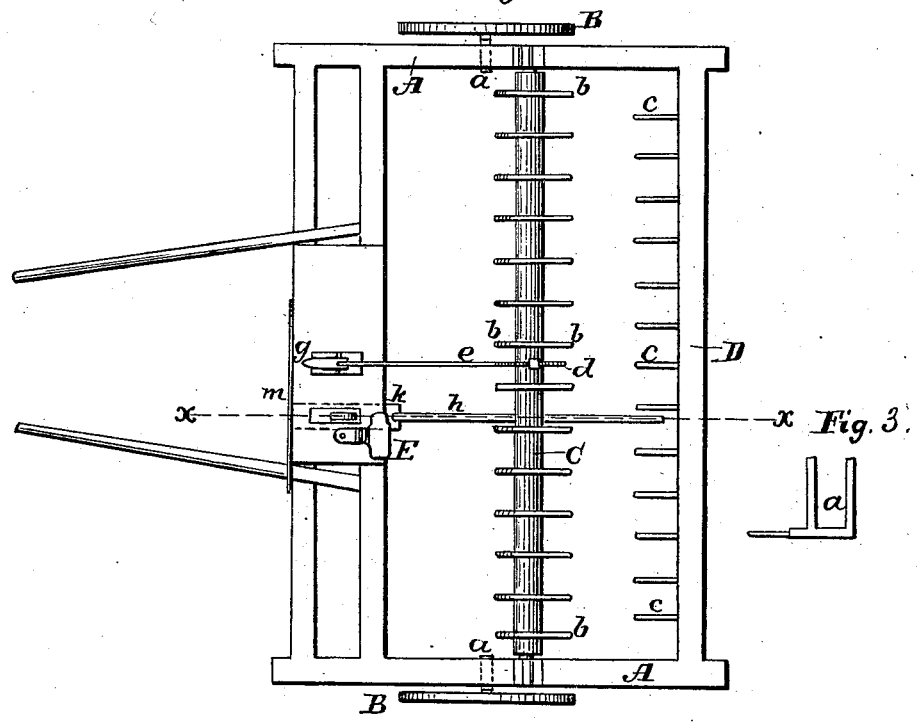
Fig. 2.
Fig. 3.
Witnesses:
Inventor:
A. B. Johnson

UNITED STATES PATENT OFFICE.

A. B. JOHNSON, OF WASHINGTON, INDIANA.

IMPROVEMENT IN HORSE-RAKES.

Specification forming part of Letters Patent No. 84,551, dated December 1, 1868.

*To all whom it may concern:*

Be it known that I, A. B. JOHNSON, of Washington, in the county of Daviess and State of Indiana, have invented a new and useful Improvement in Revolving Horse-Rake; and I do hereby declare that the following is a full, clear, and exact description thereof, which will enable others skilled in the art to make and use the same, reference being had to the accompanying drawings, forming part of this specification, in which—

Figure 1 is a vertical cross-section of my improved rake, taken on the line $x\ x$, Fig. 2. Fig. 2 is a top view; Fig. 3, a detail of the axle and stirrup.

Similar letters of reference indicate like parts.

This invention relates to new and useful improvements in the construction of a double revolving horse hay-rake, which improvements consist in adjustable axles for the driving-wheels suspended to the side beams of the frame by stirrups, and an arrangement of devices for holding the rake while at work and turning it over to discharge the hay, as hereinafter described.

This improved rake is very simple, and easily made in the country, with wood and wrought-iron only, and is strong and effective as a gleaner.

A A are the side beams of a frame mounted on wheels B B, that are hung on axles which project from the stirrups $a\ a$, fastened by a bolt to the middle of the side beams, A A, and made with a series of holes for adjusting, and thus raising and lowering, the frame to suit wagon-wheels of different sizes, and bring the rake-teeth nearer to or farther from the ground. C is the rake-head, on opposite sides of which are fastened semicircular teeth $b\ b$, with their heads let in flush with the surface of the rake-head, to hold the teeth firmly in place.

On the rear cross-beam, D, are fastened teeth $c\ c$, which project inward, so that the rake-teeth pass between them when the rake revolves, and thus have the hay all stripped from them entirely.

A toothed wheel, $d$, is set on the middle of the rake-head C, and a hooked pawl, $e$, engages in its teeth to turn the rake-head over by means of a lever, $g$, pivoted to the frame near the driver's seat E in front.

Near the toothed wheel $d$ a straight rod, $h$, passes through the rake-head, the ends of which alternately catch against a slide, $k$, when the rake is turned over, in order to hold it while it is raking.

The slide $k$ is provided with a foot-rest, $k'$, by which the driver can push the slide out and release the rod $h$ when the rake is turned by the lever and pawl, and a spring, $m$, throws the slide $k$ out again to catch the rod $h$ after the rake has turned and hold it fast.

Having thus described my invention, what I claim as new, and desire to secure by Letters Patent, is—

1. Hanging the wheels B B to adjustable stirrups $a\ a$, fastened on the middle of the side framing, A, arranged as and for the purpose specified.

2. The combination of the toothed wheel $d$, the pawl $h$, and the lever $g$, arranged substantially as and for the purpose herein described.

3. The rod $h$, combined with the slide $k$ and the spring $m$, arranged and operating as and for the purpose set forth.

A. B. JOHNSON.

Witnesses:
  ISAAC T. KEITT,
  URIAH GOOD.